US011867360B2

(12) United States Patent
Ma et al.

(10) Patent No.: US 11,867,360 B2
(45) Date of Patent: Jan. 9, 2024

(54) CLOSED-LOOP SAFETY VENTILATION SYSTEM FOR FULLY-MOUNDED TANK

(71) Applicants: SHANDONG CHAMBROAD HOLDING GROUP CO., LTD., Binzhou (CN); SHANDONG CHAMBROAD EQUIPMENT MANUFACTURE INSTALLATION CO., LTD., Binzhou (CN)

(72) Inventors: Yunsheng Ma, Binzhou (CN); Liqiu Zhao, Binzhou (CN); Chenghe Zhang, Binzhou (CN); Shiheng Ma, Binzhou (CN); Bo Yan, Binzhou (CN); Qingsong Zhao, Binzhou (CN); Bingzhan Li, Binzhou (CN)

(73) Assignees: SHANDONG CHAMBROAD HOLDING GROUP CO., LTD., Binzhou (CN); SHANDONG CHAMBROAD EQUIPMENT MANUFACTURE INSTALLATION CO., LTD., Binzhou (CN)

( * ) Notice: Subject to any disclaimer, the term of this patent is extended or adjusted under 35 U.S.C. 154(b) by 72 days.

(21) Appl. No.: 17/998,423

(22) PCT Filed: Apr. 12, 2021

(86) PCT No.: PCT/CN2021/086667
§ 371 (c)(1),
(2) Date: Nov. 10, 2022

(87) PCT Pub. No.: WO2022/193384
PCT Pub. Date: Sep. 22, 2022

(65) Prior Publication Data

US 2023/0139902 A1 May 4, 2023

(30) Foreign Application Priority Data

Mar. 19, 2021 (CN) ........................ 202110297177.2

(51) Int. Cl.
*F17C 13/12* (2006.01)

(52) U.S. Cl.
CPC ...... *F17C 13/12* (2013.01); *F17C 2205/0326* (2013.01); *F17C 2205/0332* (2013.01);
(Continued)

(58) Field of Classification Search
CPC ................ F17C 2260/042; F17C 13/12; F17C 2250/043; F17C 2250/032;
(Continued)

(56) References Cited

U.S. PATENT DOCUMENTS

| | | | | |
|---|---|---|---|---|
| 2006/0076076 | A1 | 4/2006 | Darling, IV et al. | |
| 2019/0389654 | A1* | 12/2019 | Young | B65D 90/503 |
| 2020/0292129 | A1* | 9/2020 | Barker | F17C 13/04 |

FOREIGN PATENT DOCUMENTS

| | | | |
|---|---|---|---|
| CN | 204729911 | U | 10/2015 |
| CN | 205026390 | U | 2/2016 |

(Continued)

OTHER PUBLICATIONS

PCT/CN2021/086667—International Search Report, dated Sep. 18, 2021, 2 pages.

(Continued)

*Primary Examiner* — Ko-Wei Lin
(74) *Attorney, Agent, or Firm* — Getech Law LLC; Jun Ye

(57) ABSTRACT

The present disclosure relates to a field of soil-covered tank and includes a gas collecting and exhausting unit, a safety sealing unit and a closed-loop ventilation unit; a gas collecting pipe is located in a valve chamber and a channel, and the gas collecting pipe, a fan and an exhaust pipe are connected in sequence; a gas monitor of the safety sealing unit is used for monitoring concentration of combustible gases, a controller is connected to the gas monitor, a
(Continued)

temperature sensor, a valve and a fan by conducting wires, and the controller set a warning temperature value and a warning gases concentration value and is capable of controlling actions of the valve and the fan; and the closed-loop ventilation unit is formed among a plurality of gas collecting and exhausting units.

8 Claims, 2 Drawing Sheets

(52) U.S. Cl.
CPC .. *F17C 2221/033* (2013.01); *F17C 2250/032* (2013.01); *F17C 2250/043* (2013.01); *F17C 2250/0439* (2013.01); *F17C 2250/0452* (2013.01); *F17C 2260/042* (2013.01); *F17C 2270/0147* (2013.01)

(58) Field of Classification Search
CPC .......... F17C 2260/038; F17C 2221/033; F17C 2250/0439; F17C 2250/0452; F17C 2205/0332
See application file for complete search history.

(56) References Cited

FOREIGN PATENT DOCUMENTS

| | | | |
|---|---|---|---|
| CN | 106761654 | A | 5/2017 |
| CN | 206800461 | U | 12/2017 |
| CN | 112483887 | A | 3/2021 |
| FR | 2944517 | A1 | 10/2010 |

OTHER PUBLICATIONS

CN 202110297177.2—First Office Action, dated Aug. 3, 2021, 18 pages. (with English translation).
CN 202110297177.2—Notice of Allowance, dated Sep. 15, 2021, 7 pages. (with English translation).

* cited by examiner

CLOSED-LOOP SAFETY VENTILATION SYSTEM FOR FULLY-MOUNDED TANK

CROSS REFERENCE OF RELATED APPLICATIONS

This is a 371 of International Application No. PCT/CN2021/086667, filed Apr. 12, 2021 which claims priority from Chinese Patent Application No. 202110297177.2, filed on Mar. 19, 2021, the contents of the aforementioned applications are herein incorporated by reference in their entireties.

FIELD

The present disclosure relates to a field of a soil-covered tank, in particular to a closed-loop safety ventilation system for a fully-mounded tank.

BACKGROUND

Soil covering storage means that a liquefied petroleum gas at a normal temperature is pressurized and stored in tank or under the ground and is subjected to reasonable comprehensive backfill, this technology is very suitable for storing a flammable and explosive liquid material and can be used for protecting a tank body, preventing heat and shock waves generated by combustion and explosion from affecting other tank bodies, effectively reducing risks and ensuring that one tank body is mounted closer to one another, thereby saving the land. At present, a technology for a fully-mounded tank has not been mature; at abroad, mainly adopted is a half-layer soil covering technology by which the upper layer of the tank body is covered with soil and the bottom of the tank body is provided with a supporting member; however, in view of safety, the advantages of complete covering of soil are more obvious. However, if the tank body is completely covered with soil, a valve chamber and a channel have to be arranged near the tank body to perform layout management on pipelines. Materials stored in the tank body completely covered with soil easily diffuse harmful gases such as oil gases in spaces such as valve and the channel during long-term storage. In order to ensure that a process system normally operates and the concentration of the harmful gases are lowered to be in a range allowed by safety production, a specific ventilation system has to be equipped for the system for a fully-mounded tank, in which influences brought by temperature have to be further taken into account, and thus, the problem of oil gas combustion caused by partial high temperature is avoided. In a word, the system for a fully-mounded tank has higher requirements on timely and safe ventilation, and there has been no feasible solutions in the prior art.

SUMMARY

The present disclosure provides a closed-loop safety ventilation system for a fully-mounded tank, by which accumulation of harmful and combustible gases inside a valve chamber and a channel can be avoided, the concentration of dangerous gases can be automatically monitored, air exchange treatment can be automatically performed, and the concentration of the dangerous gases can be controlled within a safety range all the time; in addition, temperature in the valve chamber and the channel can also be monitored, and if the temperature reach a warning temperature value, internal and external air flow interaction is cut off immediately, so that the phenomenon that external air enters for combustion and detonation is avoided, and explosion caused by excessively high temperature is avoided; harmful and combustible components in the gases discharged from the valve chamber and the channel can be adsorbed and filtered in time, so that the gases can be recycled and reach higher safety and environment protection standards; and the overall system can monitor and re-warn dangerous conditions to avoid greater hazards for the fully-mounded tank, thereby solving the above-mentioned technical problems.

A technical solution adopted for solving the above-mentioned technical problems in the present disclosure is that:

a closed-loop safety ventilation system for a fully-mounded tank structurally includes a gas collecting and exhausting unit, a safety sealing unit and a closed-loop ventilation unit; the gas collecting and exhausting unit includes gas collecting pipe, the gas collecting pipe are arranged in a valve chamber and a channel, the valve chamber and the channel are arranged inside a soil-covered side slope, the soil-covered side slope is formed outside at least one tank body, the gas collecting pipe is connected to an air inlet end of a fan, and an air outlet end of the fan is connected to an exhaust pipe; the gas collecting pipe is located in the valve chamber and the channel, the fan and the exhaust pipe are located outside the valve chamber and the channel, and the gas collecting pipe is used for absorbing gases inside the valve chamber and the channel, so that a relative negative pressure state is formed inside the valve chamber and the channel;

the safety sealing unit includes a gas monitor, a temperature sensor, a valve and a controller; the gas monitor is arranged inside the valve chamber or the channel and is used for monitoring concentration of combustible gases, the temperature sensor is arranged inside the valve chamber or the channel, the valve is arranged in the gas collecting pipe, the controller is connected to the gas monitor, the temperature sensor, the valve and the fan by conducting wires, and the controller set a warning gas concentration value and a warning temperature value, and if concentration value of the combustible gases reaches the warning gas concentration value, the controller enable the valve to be opened, and the fan works to exhaust the gases outwards; and if the temperature sensor detects that actual temperature value reaches the warning temperature value, the valve act to close the gas collecting pipe; and the closed-loop ventilation unit includes a gas treatment device and a gas storage tank, the gas treatment device is arranged outside the soil-covered side slope, the gas treatment device is connected to the exhaust pipe to adsorb and filter harmful components in the gases discharged from the valve chamber and the channel, a gas outlet end of the gas treatment device is connected to a circulating pipe, the circulating pipe is connected to the gas storage tank, the gas storage tank is connected to the exhaust pipe by gas compensation pipe, a one-way valve is arranged in the gas compensation pipe, the one-way valve only allow the gases in the gas storage tank to enter the exhaust pipe, and the fan is capable of delivering the gases in the gas storage tank into the valve chamber and the channel, and thus, the closed-loop ventilation system is formed. The gases from the valve chamber and the channel enter the gas treatment device via the exhaust pipe, the harmful gases are adsorbed and filtered by the gas treatment device, the treated clean gases enter the gas storage tank for temporary storage via the circulating pipe, and the gas storage tank is connected to the exhaust pipe by the gas compensation pipe; when air is required to be supplied to the valve chamber or channel, the gases inside the gas storage tank may enter the exhaust pipe via the gas compensation pipe and are finally delivered into the valve chamber and the channel via the fan and the gas collecting pipe, in this way, a closed-loop gas circulation system is formed, so that smooth air pressures inside and outside the valve chamber and the channel can be maintained. Moreover, the gas compensation pipe is also internally provided with the one-way valve by which the treated gases in the gas storage tank is only allowed to be discharged, but gases from an opposite direction cannot be discharged into the gas storage tank, and thus, the gases in the gas storage tank can be prevented from being polluted. In this way, the harmful gases and the combustible gases cannot be directly discharged to the outside all the time, but can circulate in a closed-loop system and are recycled, and the harmful components are filtered and adsorbed in a flow process, in this way, environment pollution and potential safety hazards caused by directly discharging the harmful components to the outside can be avoided, and the requirements for environment protection and safety are better met.

In a preferred implementation, the fan is also capable of delivering gases outside the exhaust pipe to the exhaust pipe to supply air to the insides of the channel and the valve chamber, and an air supply volume of the fan cannot exceed 80% of an exhaust volume of the fan within the same time period, so that the relative negative pressure state is maintained inside the valve chamber and the channel The fan is not only capable of discharging the gases inside the valve chamber and the channel to the outside, but also capable of reversely delivering external gases into the valve chamber and the channel, in such a way, the harmful gases accumulated inside the valve chamber and the channel can be discharged, and dangers such as explosion caused by excessively high concentrations due to great accumulation of the harmful gases can be effectively avoided; moreover, relatively clean gases can be delivered into the valve chamber and the channel to ensure that air pressures inside the valve chamber and the channel can be maintained in a relatively stable state; and meanwhile, it is also ensured that the air supply volume of the fan does not exceed 80% of the exhaust volume of the fan within the same time period, in this way, the relative negative pressure state can be maintained inside the valve chamber and the channel, it can be ensured that the gases inside the valve chamber and the channel are outwards discharged along the gas collecting pipe, and forward circulation of the gases in the overall system and a good air exchange effect can be guaranteed.

In a preferred implementation, the fan is capable of being correspondingly connected to a plurality of the tank bodies and the gas collecting pipes thereof, and one fan is correspondingly connected to one gas storage tank.

The fan is correspondingly connected to the plurality of the tank bodies and the gas collecting pipes thereof, by which one fan can collect gases in the plurality of the tank bodies and the gas collecting pipes, so that the utilization ratio of the fan can be increased, energy can be saved, and the spatial area occupied in a plant area can be reduced; and one fan is correspondingly connected to one gas storage tank, which is beneficial to assurance that treatment of the harmful gases and the compensation of the clean gases are more ordered and are better guaranteed.

In a preferred implementation, the gas storage tank is provided with an air pressure gauge and a pressure relief valve. Due to the arrangement of the air pressure gauge and the pressure relief valve, pressure of the gases inside the gas storage tank can also be monitored. When the pressure of the gases inside the gas storage tank is excessively high, the pressure can also be relieved in time by the pressure relief valve, so that dangers can be avoided, and the safety of the overall system is enhanced.

In a preferred implementation, the exhaust pipe is provided with a flow valve, and the flow valve is connected to the controllers by conducting wire and is used for controlling exhaust volumes.

By arranging the flow valve, the exhaust volume or intake volume within a period of time can be monitored, then, obtained signal is transferred to the controller, and the controller perform next control according to the transferred signal, so that serious hazards caused by pressure maladjustment inside the valve chamber and the channel are avoided. The controller can control the volume of the gases entering or exiting the valve chamber and the channel by adjusting the flow valve or controlling the working power of the fan. The above-mentioned structure is convenient to use, rapid in response and capable of improving the safety performance of the overall system.

In a preferred implementation, the closed-loop safety ventilation system for the fully-mounded tank further includes an alarm, the alarm is connected to the controller by conducting wires, and if actual concentration of the combustible gases inside the valve chamber and the channel reaches the warning gases concentration value, the controller triggering the alarm.

By adopting the above-mentioned structure, the concentration of the combustible gases inside the valve chamber and the channel can be accurately detected, and the warning concentration value can be preset. When the actual concentration of the combustible gases reach the warning concentration value, the controllers trigger the alarm, the corresponding fan is interlocked with the alarm, and the fan is started when the alarm give alarm. At the moment, working staffs can rapidly take effective measures, so that the situation that the combustible gases inside the valve chamber and the channel are further accumulated to even reach the explosion level is avoided, more serious conditions can be avoided, and the safety of the overall system is improved.

In a preferred implementation, the valve is set as an anti-explosion and fireproof valve. If dangerous conditions such as combustible gas explosion occur in the valve chamber and the channel, the anti-explosion and fireproof valve located in the gas collecting pipe become safety defense lines and can avoid the phenomenon that influences caused by explosion further spread outwards to affect gas tank bodies or devices, and therefore, the safety performance is high.

In a preferred implementation, the warning temperature value is set as 70° C., and after the temperature sensor monitor that actual temperature reaches the warning temperature value, the anti-explosion and fireproof valve is fused to close the gas collecting pipe, and meanwhile, the corresponding interlocked fan is closed.

If the above-mentioned temperature sensor monitor that the actual temperature reach the warning temperature, it is proven that the temperature is excessively high at the moment, and the dangerous conditions easily occur. At the moment, the anti-explosion and fireproof valve can be fused, and the gas collecting pipe can be closed, so that the phenomenon that a high-temperature heat source is in contact with the high-concentration harmful gases and even combusts and explodes can be stopped, and further hazards can be avoided.

In a preferred implementation, the gas collecting pipe in the valve chamber and the channel is provided with a plurality of ventilation openings at intervals. The arrangement of the ventilation openings can play a role in preventing the air pressure or gas concentration inside the valve chamber and the channel from being excessively high under an ordinary condition and is beneficial to the improvement on the safety of the overall system.

In a preferred implementation, the fan is set as an anti-explosion mixed flow fan.

The harmful gases such as oil gases may be diffused by the valve chamber and the channel of two tank bodies completely covered with soil. In order to ensure that a process system normally operates and the concentrations of the harmful gases are lowered to be in a range allowed by safety production, a mechanical ventilation way is adopted, and the anti-explosion mixed flow fan is respectively arranged for air supply or exhaust. With 1000 $m^3$ spherical tank as an example, the ventilation times of the valve chamber and the channel of the soil-covered tank is 12 times/h, and the ventilation volume of the valve chamber is 254 $m^3/h$. The ventilation volume of the channel is 1660 $m^3/h$, the air supply volume of the fan is 80% of the exhaust volume of the fan, and the valve chamber and the channel is maintained at negative pressure state. Firstly, the above-mentioned fan is good in aerodynamic performance and airflow distribution and stable in pressure; and secondly, the fan can also play an obstruction role when the dangerous conditions such as combustible gas explosion occur.

By adopting the above-mentioned structure, the present disclosure has the beneficial effects that accumulation of harmful and combustible gases inside the valve chamber and the channel can be avoided, the concentrations of the dangerous gases can be automatically monitored, air exchange treatment can be automatically performed by the closed-loop safety ventilation system, and the concentrations of the dangerous gases can be controlled within a safety range all the time; in addition, temperature in the valve chamber and the channel can also be monitored, and if the temperature reach the warning temperature value, internal and external air flow interaction is cut off immediately, so that the phenomenon that external air enters for combustion and detonation is avoided, and explosion caused by excessively high temperature is avoided; harmful and combustible components in the gases discharged from the valve chamber and the channel can be adsorbed and filtered in time, so that the gases can be recycled and reach higher safety and environment protection standards; and the overall system can monitor and re-warn dangerous conditions to avoid greater hazards for the soil-covered tanks.

BRIEF DESCRIPTION OF THE DRAWINGS

The accompanying drawings described herein are provided for further understanding of the present disclosure, and constitute one part of the present disclosure. Exemplary embodiments of the present disclosure and their descriptions are intended to explain the present disclosure, rather than to constitute improper limitations on the present disclosure. In the accompanying drawings.

In the drawings.

1, gas collecting pipe; 101, valve; 2, fan; 3, exhaust pipe; 301, flow valve; 4, valve chamber; 401, gas monitor; 402, temperature sensor; 5, controller; 6, channel; 7, soil-covered side slope; 8, tank body; 9, conducting wire; 10, gas treatment device; 11, circulating pipe; 12, gas storage tank; 1201, air pressure gauge; 1202, pressure relief valve; 13, gas compensation pipe; 1301, one-way valve; 14, alarm; and 15, ventilation opening.

DETAILED DESCRIPTION OF THE EMBODIMENTS

In order to describe the overall concept of the present disclosure more clearly, detailed descriptions will be further shown below with reference to the accompanying drawings of the description by way of examples.

It needs to be noted that many concrete details are shown in the following descriptions to facilitate the sufficient understanding of the present disclosure, however, the present disclosure can also be implemented in other ways different from the ways described herein, and therefore, the protection scope of the present disclosure is not limited by the specific embodiments disclosed below.

Figure 1:
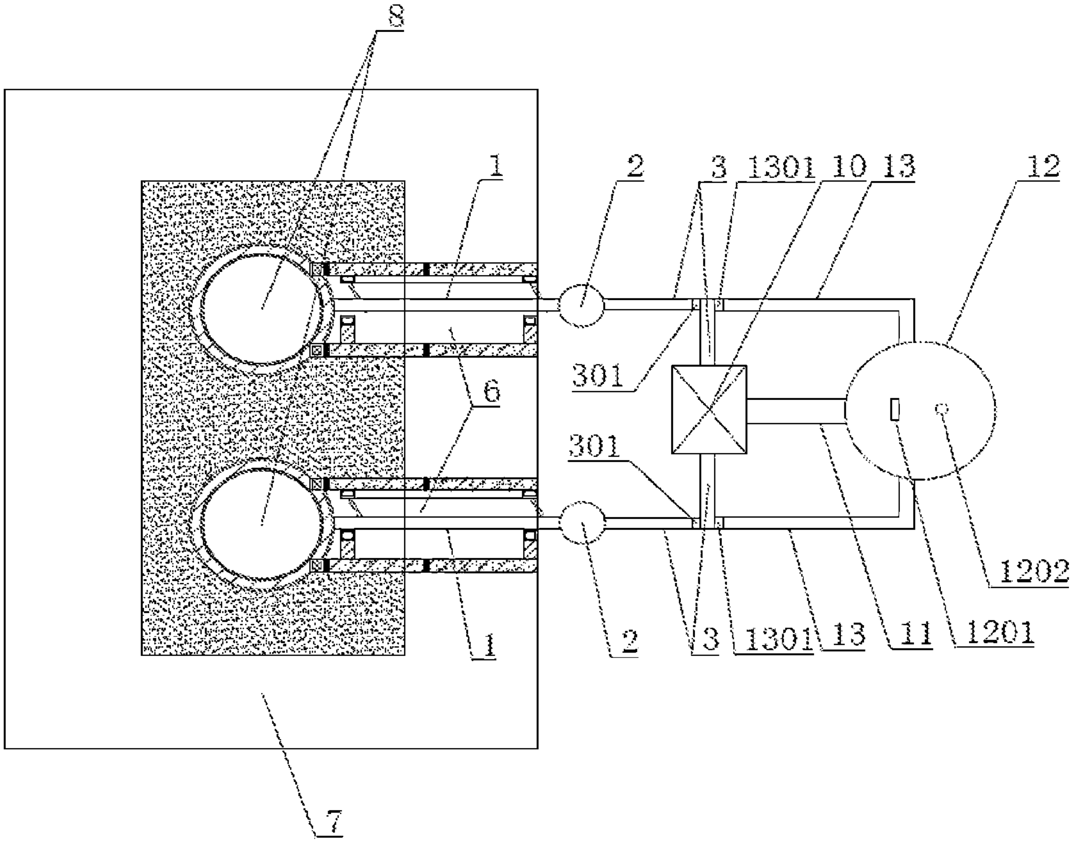
FIG. 1 is a schematic view of a vertical-view section in a implementation of the present disclosure.
Figure 2:
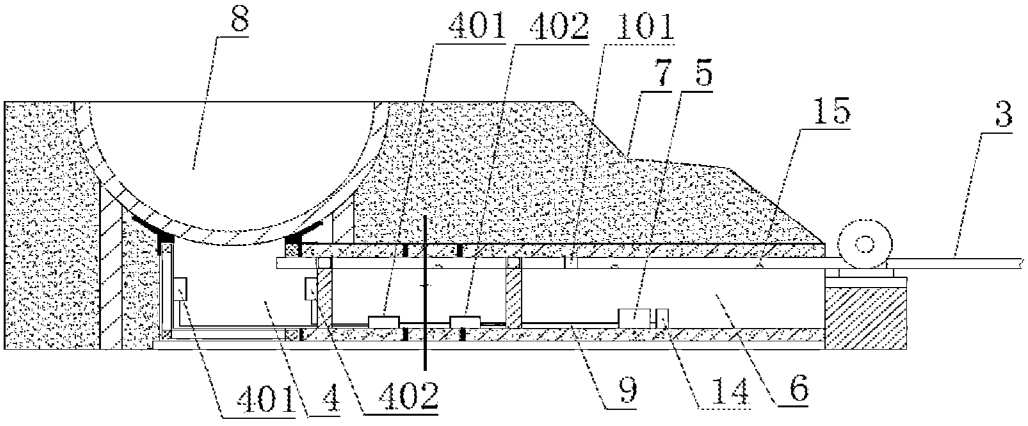
FIG. 2 is a schematic view of a main-view section in a implementation of the present disclosure.

As shown in FIG. 1 to FIG. 2, a closed-loop safety ventilation system for a fully-mounded tank structurally includes a gas collecting and exhausting unit, a safety sealing unit and a closed-loop ventilation unit; the gas collecting and exhausting unit includes gas collecting pipe 1, the gas collecting pipe 1 is arranged in valve chamber 4 and channel 6, the valve chamber 4 and the channel 6 are arranged inside a soil-covered side slope 7, the soil-covered side slope 7 is formed outside tank body 8, the gas collecting pipe 1 is connected to an air inlet end of a fan 2, and an air outlet end of the fan 2 is connected to exhaust pipe 3; the gas collecting pipe 1 is located in the valve chamber 4 and the channel 6, the fan 2 and the exhaust pipe 3 are located outside the valve chamber 4 and the channel 6, and the gas collecting pipe 1 is used for absorbing gases inside the valve chamber 4 and the channel 6, so that a relative negative pressure state is formed inside the valve chamber 4 and the channel 6;

the safety sealing unit includes a gas monitor 401, a temperature sensor 402, a valve 101 and a controller 5; two gas monitors 401 are arranged inside the valve chamber 4 and the channel 6 respectively and are used for monitoring concentration of combustible gases in the valve chamber 4 and the channel 6 respectively, two temperature sensor 402 are arranged inside the valve chamber 4 and the channel 6 respectively, the valve 101 is arranged in the gas collecting pipe 1, the controller 5 is connected to the gas monitor 401, the temperature sensor 402, the valve 101 and the fan 2 by conducting wires 9, and the controller 5 set a warning gas concentration value and a warning temperature value, and if concentration value of the combustible gases reaches the warning gases concentration value, the controller 5 enable the valve 101 to be opened, and the fan 2 work to exhaust the gases outwards; and if the temperature sensor 402 detects that actual temperature value reaches the warning temperature value, the valve 101 act to close the gas collecting pipe 1; and the closed-loop ventilation unit includes a gas treatment device 10 and a gas storage tank 12, the gas treatment device 10 is arranged outside the soil-covered side slope 7, the gas treatment device 10 is connected to the exhaust pipe 3 to adsorb and filter harmful components in the gases discharged from the valve chamber 4 and the channel 6, a gas outlet end of the gas treatment device 10 is connected to a circulating pipe 11, the circulating pipe 11 is connected to the gas storage tank 12, the gas storage tank 12 is connected to the exhaust pipe 3 by gas compensation pipe 13, an one-way valve 1301 is arranged in the gas compensation pipe 13, the one-way valve 1301 only allow the gases in the gas storage tank 12 to enter the exhaust pipe 3, and the fan 2 is capable of delivering the gases in the gas storage tank 12 into the valve chamber 4 and the channel 6, and thus, the closed-loop ventilation system is formed. The gases from the valve chamber 4 and the channel 6 enter the gas treatment device 10 via the exhaust pipe 3, the harmful gases are adsorbed and filtered by the gas treatment device 10, the treated clean gases enter the gas storage tank 12 for temporary storage via the circulating pipe 11, and the gas storage tank 12 is connected to the exhaust pipe 3 by the gas compensation pipe 13; when air is required to be supplied to the valve chamber 4 or channel 6, the gases inside the gas storage tank 12 may enter the exhaust pipe 3 via the gas compensation pipe 13 and are finally delivered into the valve chamber 4 and the channel 6 via the fan 2 and the gas collecting pipe 1, in this way, a closed-loop airflow circulation system is formed, so that smooth air pressures inside and outside the valve chamber and the channel can be maintained. Moreover, the gas compensation pipe 13 is also internally provided with the one-way valve 1301 by which the treated gases in the gas storage tank 12 are only allowed to be discharged, but gases from an opposite direction cannot be discharged into the gas storage tank 12, and thus, the gases in the gas storage tank 12 can be prevented from being polluted. In this way, the harmful gases and the combustible gases cannot be directly discharged to the outside all the time, but can circulate in a closed-loop system and are recycled, and the harmful components are filtered and adsorbed in a flow process, in this way, environment pollution and potential safety hazards caused by directly discharging the harmful components to the outside can be avoided, and the requirements for environment protection and safety are better met.

Further, the fan 2 is also capable of delivering gases outside the exhaust pipe 3 to the exhaust pipe 3 to supply air to the insides of the channel 6 and the valve chamber 4, and the air supply volume of the fan 2 cannot exceed 80% of the exhaust volume of the fan 2 within the same time period, so that the relative negative pressure state is maintained inside the valve chamber 4 and the channel 6.

The fan 2 is not only capable of discharging the gases inside the valve chamber 4 and the channel 6 to the outside, but also capable of reversely delivering external gases into the valve chamber 4 and the channel 6, in such a way, the harmful gases accumulated inside the valve chamber 4 and the channel 6 can be discharged, and dangers such as explosion caused by excessively high concentration due to great accumulation of the harmful gases can be effectively avoided; moreover, relatively clean gases can be delivered into the valve chamber 4 and the channel 6 to ensure that air pressure inside the valve chamber 4 and the channel 6 can be maintained in a relatively stable state; and meanwhile, it is also ensured that the air supply volume of the fan 2 does not exceed 80% of the exhaust volume of the fan 2 within the same time period, in this way, the relative negative pressure state can be maintained inside the valve chamber 4 and the channel 6, it can be ensured that the gases inside the valve chamber 4 and the channel 6 are outwards discharged along the gas collecting pipe 1, and forward circulation of the gases in the overall system and a good air exchange effect can be guaranteed.

Further, the fan 2 is capable of being correspondingly connected to a plurality of the tank bodies 8 and the gas collecting pipes 1 thereof, and one fan 2 is correspondingly connected to one gas storage tank 12.

The fan 2 is correspondingly connected to a plurality of the tank bodies 8 and the gas collecting pipes 1 thereof, by which one fan 2 can collect gases in the plurality of tank bodies 8 and the gas collecting pipes 1, so that the utilization ratio of the fan 2 can be increased, energy can be saved, and the spatial area occupied in a plant area can be reduced; and one fan 2 is correspondingly connected to one gas storage tank 12, which is beneficial to assurance that treatment of the harmful gases and the compensation of the clean gases are more ordered and are better guaranteed.

In a preferred implementation, the gas storage tank 12 is provided with an air pressure gauge 1201 and a pressure relief valve 1202.

Due to the arrangement of the air pressure gauge 1201 and the pressure relief valve 1202, pressures of the gases inside the gas storage tank 12 can also be monitored. When the pressures of the gases inside the gas storage tank 12 are excessively high, the pressures can also be relieved in time by the pressure relief valve 1202, so that dangers can be avoided, and the safety of the overall system is enhanced.

Further, the exhaust pipe 3 is provided with a flow valve 301, and the flow valve 301 is connected to the controller 5 by conducting wire 9 and are used for monitoring exhaust volumes.

By arranging the flow valve 301, the exhaust volume or intake volume within a period of time can be monitored, then, obtained signals are transferred to the controller 5, and the controller 5 perform next control according to the transferred signals, so that serious hazards caused by pressure maladjustment inside the valve chamber 4 and the channel 6 are avoided. The controller 5 can control the volume of the gases entering or exiting the valve chamber 4 and the channel 6 by adjusting the flow valves 301 or controlling the working power of the fan 2. The above-mentioned structure is convenient to use, rapid in response and capable of improving the safety performance of the overall system.

Further, the closed-loop safety ventilation system for the fully-mounded tank further includes alarm 14, the alarm 14 are connected to the controller 5 by conducting wire 9, the controller 5 set a warning concentration value of the combustible gases, and when actual concentration value of the combustible gases inside the valve chamber 4 and the channel 6 reach the warning concentration value, the controllers 5 trigger the alarm 14.

By adopting the above-mentioned structure, the concentration of the combustible gases inside the valve chamber 4 and the channel 6 can be accurately detected, and the warning concentration value can be preset. When the actual concentration value of the combustible gases reach the warning concentration value, the controller 5 trigger the alarm 14, the corresponding fan 2 is interlocked with the alarm 14, and the fan 2 is started when the alarm 14 give alarm. At the moment, working staffs can rapidly take effective measures, so that the situation that the combustible gases inside the valve chamber 4 and the channel 6 are further accumulated to even reach the explosion level is avoided, more serious conditions can be avoided, and the safety of the overall system is improved.

Further, the valve 101 is set as anti-explosion and fireproof valve. If dangerous conditions such as combustible gas explosion occur in the valve chamber 4 and the channel 6, the anti-explosion and fireproof valve located in the gas collecting pipe 1 become safety defense lines and can avoid the phenomenon that influences caused by explosion further spread outwards to affect gas tank body 8 or device, and therefore, the safety performance is high.

Further, the warning temperature is set as 70° C., and if the temperature sensor 402 monitor that actual temperature reach the warning temperature value, the anti-explosion and fireproof valve is fused to close the gas collecting pipe 1, and meanwhile, the corresponding interlocked fan 2 is closed.

After the above-mentioned temperature sensor 402 monitor that the actual temperature reach the warming temperature value, it is proven that the temperature is excessively high at the moment, and the dangerous conditions easily occur. At the moment, the anti-explosion and fireproof valve can be fused, and the gas collecting pipe 1 can be closed, so that the phenomenon that a high-temperature heat source is in contact with the high-concentration harmful gases and even combusts and explodes can be stopped, and further hazards can be avoided.

Further, the gas collecting pipe 1 in the valve chamber 4 and the channel 6 is provided with a plurality of ventilation openings 15 at intervals. The ventilation openings can be set as aluminum alloy single deflection grilles. The arrangement of the ventilation openings 15 can play a role in preventing the air pressures or gas concentrations inside the valve chamber 4 and the channel 6 from being excessively high under an ordinary condition and is beneficial to the improvement on the safety of the overall system.

Further, the fan 2 is set as anti-explosion mixed flow fan. The harmful gases such as oil gases may be diffused by the valve chambers 4 and the channels 6 of two tank bodies completely covered with soil. In order to ensure that a process system normally operates and the concentrations of the harmful gases are lowered to be in a range allowed by safety production, a mechanical ventilation way is adopted, and the anti-explosion mixed flow fan is respectively arranged for air supply or exhaust. With 1000 $m^3$ spherical tank as an example, the ventilation times of the valve chamber and the channel of the soil-covered tank is both 12 times/h, and the ventilation volume of the valve chamber is 254 $m^3$/h. The ventilation volume of the channels are 1660 $m^3$/h, the air supply volume of the fan is 80% of the exhaust volume of the fan, and the valve chamber 4 and the channel 6 are maintained at negative pressures state. Firstly, the above-mentioned fan 2 is good in aerodynamic performance and airflow distribution and stable in pressure; and secondly, the fan can also play an obstruction role when the dangerous conditions such as combustible gas explosion occur.

The technical solutions to be protected in the present disclosure are not limited to the above-mentioned embodiments. It should be indicated that combinations of the technical solution in any one of the embodiments and technical solutions in one or more of other embodiments fall within the protection scope of the present disclosure. Although the present disclosure has been described in detail with generalized descriptions and specific embodiments as above, some modifications or improvements may be made on the basis of the present disclosure, which is apparent for the skilled in the art. Therefore, all of these modifications or improvements made without departing from the spirit of the present disclosure fall within the scope claimed to be protected in the present disclosure.

What is claimed:

1. A closed-loop safety ventilation system for a tank at least one tank body completely covered with soil, comprising:

a gas collecting and exhausting unit, the gas collecting and exhausting unit comprises a gas collecting pipe, the gas collecting pipe being arranged in a valve chamber and a channel, the valve chamber and the channel being arranged inside a soil-covered side slope, the soil-covered side slope being formed outside the at least one tank body, the gas collecting pipe being connected to an air inlet end of a fan, and an air outlet end of the fan being connected to an exhaust pipe; the gas collecting pipe being located in the valve chamber and the channel, the fan and the exhaust pipe being located outside the valve chamber and the channel, and the gas collecting pipe being used for absorbing gases inside the valve chamber and the channel, so that a relative negative pressure state is formed inside the valve chamber and the channel; and a safety sealing unit, the safety sealing unit comprises a gas monitor, a temperature sensor, a valve and a controller; the gas monitor being arranged inside the valve chamber or the channel, and the gas monitor being used for monitoring concentrations of combustible gases, the temperature sensor being arranged inside the valve chamber or the channel, the valve being arranged in the gas collecting pipe, the controller being connected to the gas monitor, the temperature sensor, the valve and the fan by conducting wires, and the controller setting a warning gases concentration value and a warning temperature value, and if a concentration value of the combustible gases reaches the warning gases concentration value, the controller enabling the valve to be opened, and the fan working to exhaust the gases outward; and if the temperature sensor detects that actual temperature value reaches the warning temperature value, the valve acting to close the gas collecting pipe;

a closed-loop ventilation unit, the closed-loop ventilation unit comprises a gas treatment device and a gas storage tank, the gas treatment device being arranged outside the soil-covered side slope, the gas treatment device being connected to the exhaust pipe to adsorb and filter harmful components in the gases discharged from the valve chamber and the channel, a gas outlet end of the gas treatment device being connected to a circulating pipe, the circulating pipe being connected to the gas storage tank, the gas storage tank being connected to the exhaust pipe by a gas compensation pipe, a one-way valve being arranged in the gas compensation pipe, the one-way valve only allowing the gases in the gas storage tank to enter the exhaust pipe, and the fan being capable of delivering the gases in the gas storage tank into the valve chamber and the channel, and thus, the closed-loop ventilation system is formed;

the fan is fluidly connected to the at least one tank body and the gas collecting pipe; and the fan is also capable of delivering gases outside the exhaust pipe to the exhaust pipe to supply air to the insides of the channel and the valve chamber, and an air supply volume of the fan cannot exceed 80% of an exhaust volume of the fan within the same time period, so that the relative negative pressure state is maintained inside the valve chamber and the channel.

2. The closed-loop safety ventilation system for at least one tank body completely covered with soil of claim 1, wherein the gas storage tank is provided with an air pressure gauge and a pressure relief valve.

3. The closed-loop safety ventilation system for at least one tank body completely covered with soil of claim 1, wherein the exhaust pipe is provided with a flow valve, and the flow valve is connected to the controller by conducting wire and is used for controlling exhaust volume.

4. The closed-loop safety ventilation system for at least one tank body completely covered with soil of claim 1, further comprising an alarm, the alarm being connected to the controller by conducting wire, and if actual concentration of the combustible gases inside the valve chamber and the channel reaches the warning gases concentration value, the controller triggering the alarm.

5. The closed-loop safety ventilation system for at least one tank body completely covered with soil of claim 1, wherein the valve is set as an anti-explosion and fireproof valve.

6. The closed-loop safety ventilation system for at least one tank body completely covered with soil of claim 5, wherein the warning temperature value is 70° C., and if the temperature sensor monitors that actual temperature reaches the warning temperature value, the anti-explosion and fireproof valve is fused to close the gas collecting pipe.

7. The closed-loop safety ventilation system for at least one tank body completely covered with soil of claim 1, wherein the gas collecting pipe in the valve chamber and the channel is provided with a plurality of ventilation openings at intervals.

8. The closed-loop safety ventilation system for at least one tank body completely covered with soil of claim 1, wherein the fan is set as an anti-explosion mixed flow fan.

* * * * *